US006948626B1

(12) United States Patent
Duncan

(10) Patent No.: US 6,948,626 B1
(45) Date of Patent: Sep. 27, 2005

(54) VERTICAL UTENSIL HOLDER

(76) Inventor: Sharon B. Duncan, 14601 Locustwood La., Silver Spring, MD (US) 20905

(*) Notice: Subject to any disclaimer, the term of this patent is extended or adjusted under 35 U.S.C. 154(b) by 0 days.

(21) Appl. No.: 10/815,867

(22) Filed: Apr. 2, 2004

(51) Int. Cl.$^7$ .............................................. A47F 7/00
(52) U.S. Cl. .................................................. 211/70.7
(58) Field of Search .............................. 211/70.7, 168, 211/80, 81, 78, 71.01; 248/37.3, 37.6

(56) References Cited

U.S. PATENT DOCUMENTS

| | | | |
|---|---|---|---|
| 169,962 A | * | 11/1875 | Cross ........................... 211/81 |
| 610,249 A | * | 9/1898 | Skilton ....................... 211/70.3 |
| 1,661,787 A | | 3/1928 | Chisholm |
| 1,719,966 A | | 4/1929 | Burns |
| 1,804,912 A | * | 5/1931 | Anton .......................... 211/78 |
| 1,886,075 A | | 11/1932 | Zorsch |
| 2,136,843 A | * | 11/1938 | Dinkel ........................ 312/280 |
| 2,524,877 A | * | 10/1950 | Bergman ................. 211/131.1 |
| D166,410 S | * | 4/1952 | Press ........................... D7/364 |
| 2,632,569 A | | 3/1953 | Feldman |
| 2,664,005 A | | 12/1953 | Kosinski |
| 3,498,471 A | | 3/1970 | Dirkx |
| 3,848,943 A | | 11/1974 | Geesaman et al. |
| 4,632,347 A | | 12/1986 | Jurgich |
| 4,823,966 A | * | 4/1989 | Haber ..................... 211/128.1 |
| D422,443 S | | 4/2000 | De Limur |

FOREIGN PATENT DOCUMENTS

GB        2 075 822       11/1981

* cited by examiner

*Primary Examiner*—Sarah Purol
(74) *Attorney, Agent, or Firm*—Richard C. Litman

(57) ABSTRACT

The vertical utensil holder includes at least one upright support rod and a plurality of horizontally disposed receptacles which are mounted upon the support rod one above another. A base receptacle is mounted to a bottom end of the support rod to provide a stable base for the holder when the holder is disposed on a horizontal support surface. Each receptacle has at least one depression or shallow well defined on its upper surface, which generally corresponds in shape to the contours of the various utensils to be accommodated.

7 Claims, 8 Drawing Sheets

US 6,948,626 B1

VERTICAL UTENSIL HOLDER

BACKGROUND OF THE INVENTION

1. Field of the Invention

The present invention relates to a kitchen utensil holder, and more particularly, to a kitchen utensil holder having vertically stacked receptacles for receiving utensils. For example, some embodiments include an upright support rod and horizontally extending receptacles mounted on the support rod one above another.

2. Description of the Related Art

Various kitchen utensils are needed intermittently during a particular cooking session. For example, spoons, forks, and spatulas may all be used during one cooking session for preparing one or a variety of dishes for a particular meal. Many cooks resort to placing such utensils directly upon a kitchen counter or stove top during cooking, so that the utensils may be conveniently accessed when needed again. This creates unsightly spots or drippings of food on the surfaces of a counter or stove. Conventional utensil holders are also used for receiving utensils while cooking. Conventional utensil holders, however, occupy too much space on a stove or counter top, as they are only adapted to receive the utensils in a side-by-side fashion. A kitchen utensil holder which is adapted to receive multiple utensils at one time without occupying excessive space on a stove or counter top upon which it is placed is therefore desirable.

U.S. Pat. No. 4,632,347, issued Dec. 30, 1986 to Donald Jurgich, discloses a holder for kitchen utensils having a holder body and a complementing stand. The holder body has a central set of channels to selectively receive the handle of a spoon or other cooking utensil and has two end sets of channels to selectively fit over the rim of a container. The stand is adapted to receive the holder body.

U.S. Pat. No. 2,632,569, issued Mar. 24, 1953 to A. L. Feldman, discloses a rack for holding silverware. The rack includes an elongated open cylinder with a foraminous bottom, and a handle at the top. The sides of the cylinder comprise rings which are truncated inverted conic sections. The inverted conic sections are adapted to receive the silverware.

Other patents relating to kitchen utensil holder and similar storage devices include U.S. Des. Pat. No. 422,443, issued Apr. 11, 2000 to E. De Limur (swinging wall tray); U.S. Pat. No. 1,661,787, issued Mar. 6, 1928 to A. R. Chisholm (spoon tray); U.S. Pat. No. 1,719,966, issued Jul. 9, 1929 to P. C. Burns (holding and distributing apparatus); U.S. Pat. No. 1,886,075, issued Nov. 1, 1932 to E. A. Zorsch (knife and spoon pan rack); U.S. Pat. No. 2,524,877, issued Oct. 10, 1950 to E. Bergman (desk tray); U.S. Pat. No. 2,664,005, issued Dec. 29, 1953 to F. E. Kosinski (culinary utensil holder); U.S. Pat. No. 3,498,471, issued Mar. 3, 1970 to C. J. S. Dirkx (tray set); U.S. Pat. No. 3,848,943, issued Nov. 19, 1974 to Geesaman et al. (rotatable silverware holder); and UK Patent Application No. 2,075,822, published Nov. 25, 1981 (shoe racks).

None of the above inventions and patents, taken either singly or in combination, is seen to describe the instant invention as claimed. Thus a vertical utensil holder solving the aforementioned problems is desired.

SUMMARY OF THE INVENTION

The vertical utensil holder includes at least one upright support rod and a plurality of horizontally disposed receptacles which are mounted upon the support rod one above another. A base receptacle is mounted to a bottom end of the support rod to provide a stable base for the holder when the holder is disposed on a horizontal support surface. Each receptacle has at least one depression or shallow well defined on its upper surface, which generally corresponds in shape to the contours of the various utensils to be accommodated.

The utensil holder of the present invention conveniently stores kitchen utensils during the intervals between use in cooking operations and thus avoids soiling of a counter or stovetop. As the utensil receptacles are aligned vertically with respect to one another, the vertical utensil holder of the present invention occupies minimal space on a horizontal support surface upon which it is placed while at the same time accommodating a plurality of utensils. The vertical utensil holder of the present invention may easily fit in between burners on a stove or other convenient locations on a counter or stovetop.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
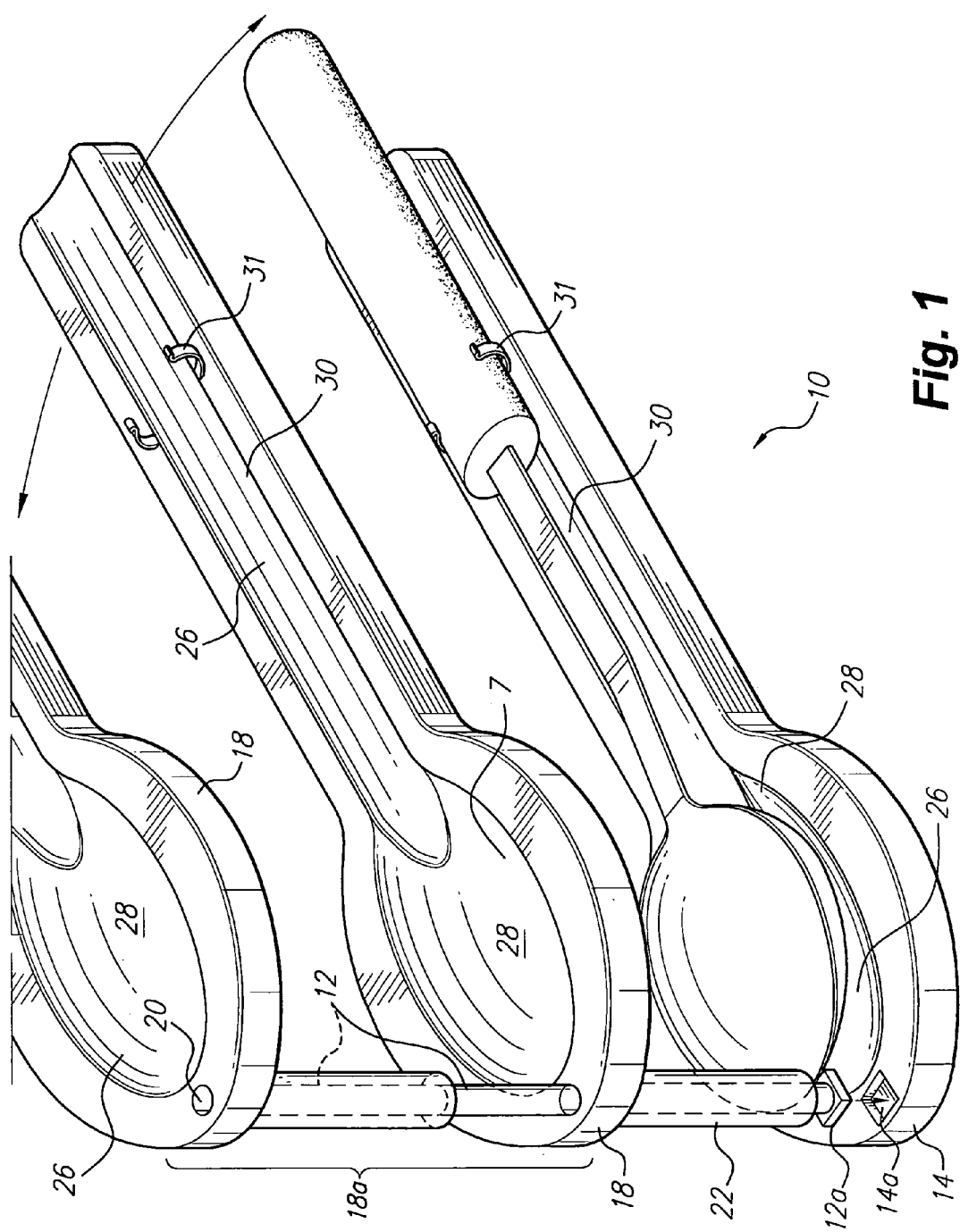
FIG. 1 is an exploded, perspective view of a vertical utensil holder according to a first embodiment of the present invention.

The present invention relates to a vertical utensil holder, generally designated as 10 in the drawings. Referring first to FIG. 1, it can be seen that the vertical utensil holder 10 includes one upright front support rod 12, a horizontally disposed first base receptacle 14 secured to a bottom end 12a of the rod 12, a plurality of elevated receptacles 18 secured to the support rod 12 above the first base receptacle 14 to form a first column of elevated receptacles 18a, and a spacer 22 disposed below each of the elevated receptacles 18. The elevated receptacles 18 in the first column 18a are vertically aligned with respect to one another and the base receptacle 14. The elevated receptacles 18 may be attached to the rod 12 in any suitable manner. Preferably, each elevated receptacle 18 has a circular aperture 20 through which the rod 12 may extend. The circular aperture 20 has a diameter that is slightly greater than the diameter of the rod 12 and thereby slidably engages the rod 12. Spacers 22 are provided on the rod 12 below each elevated receptacle 16 so that the elevated receptacles 16 may be positioned at a desired height, yet allowed to rotate around the rod 12. The bottom end 12a of the rod 12 is securely mounted to the base receptacle 14. Any suitable manner of attachment may be employed to securely attach the bottom end 12a of the rod 12 to the base receptacle 14 as long as the base receptacle 14 is held in a fixed position. For example, the rod 12 and the base receptacle 14 may be held together by gluing, welding, or by friction fit attachment of the rod 12 to the base receptacle 14. Preferably, the bottom end 12a of the rod 12 is configured to have a square shape and the base receptacle 14 is configured to have a square-shaped aperture 14a to receive and frictionally engage the end 12a of the rod 12 so that both are held in a fixed position. The base receptacle 14 provides a stable base for the holder 10 when the holder 10 is disposed on a horizontal support surface.

An upper surface of both the elevated receptacles 18 and the base receptacle 14 has a depression 26 defined therein. The depression 26 generally corresponds in shape to the contours of the various utensils to be accommodated and includes a cup portion 28 and a generally elongated stem portion 30 which extends from the cup portion 28. The stem portion 30 extends to the edge of each receptacle, 14 and 18, to allow the handles of utensils to extend beyond the receptacle so that they may be easily grasped. Handle fasteners 31 may be provided at the stem portion 30 for securing the utensil with the depression 26. Handle fasteners may include spring clasps, hooks, or other suitable structures which are capable of maintaining the handle of a utensil in place.

The vertical utensil holder 10 can be detachable or made from one piece. The vertical utensil holder can be manufactured from any suitable material, including, but not limited to plastic, ceramic, stainless steel, or wood.

Figure 2:
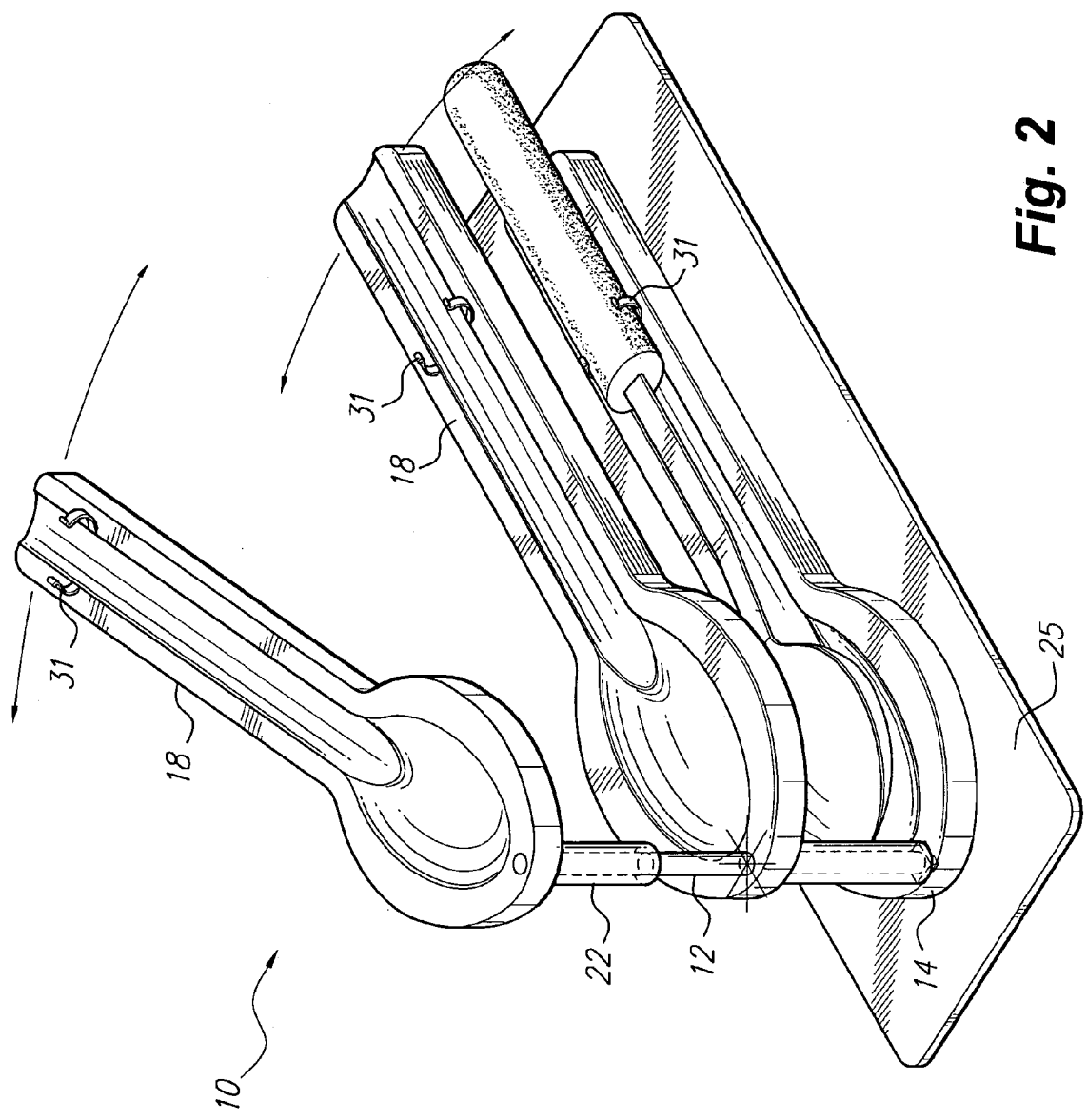
FIG. 2 is an exploded, perspective view of a vertical utensil holder according to the first embodiment of the present invention, having a horizontal support affixed thereto.

As shown in FIG. 2, the base receptacle 14 may be affixed to an additional horizontal support, such as a flat board 25 to provide the holder 10 with greater stability.

Figure 8:
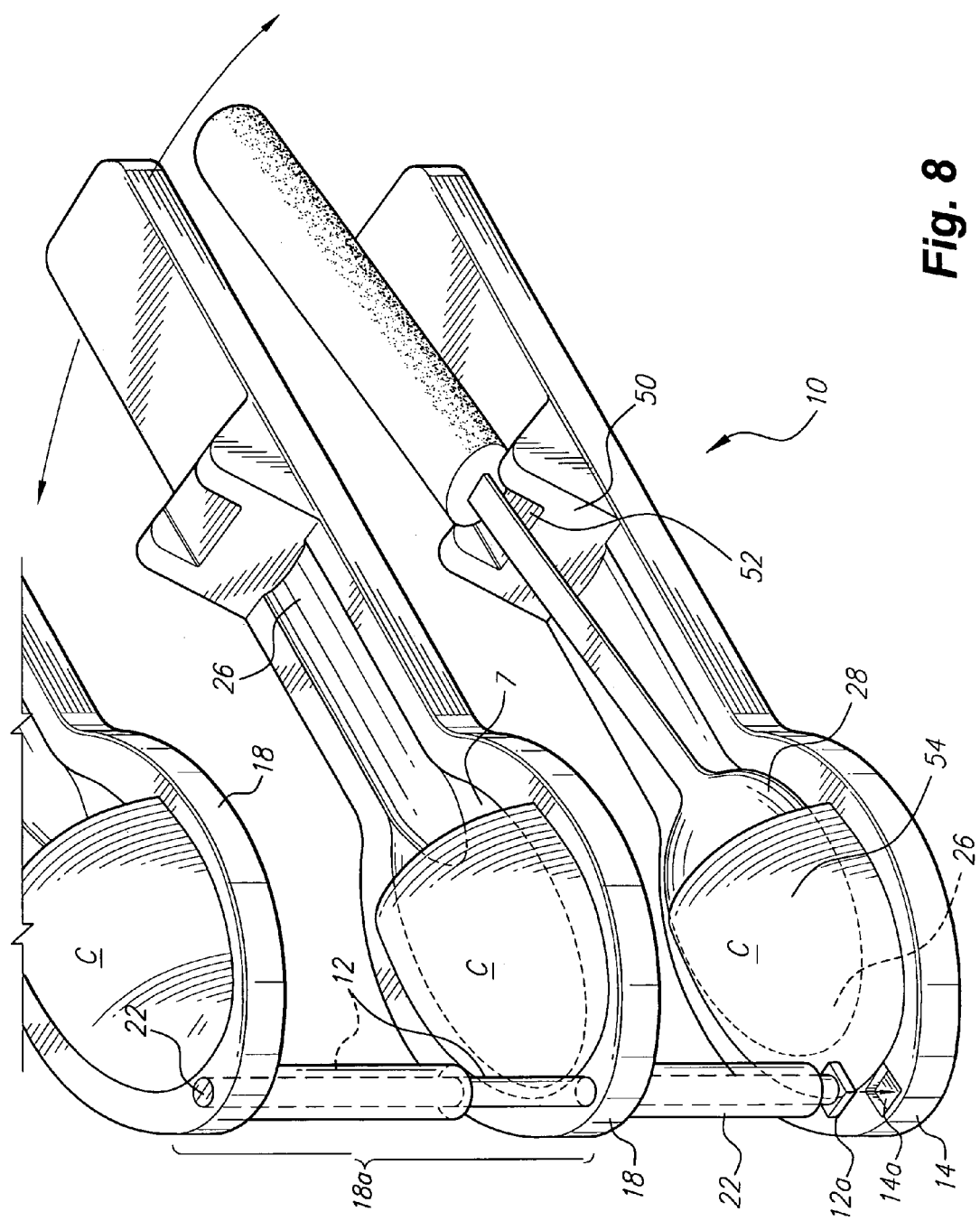
FIG. 8 is an exploded view of an embodiment of a vertical utensil holder similar to the embodiment of FIG. 1, but with a hood and a handle support added.

Referring to FIG. 8, the vertical utensil holder 10 optionally may include a handle support 50 disposed on base 14 that elevates the stem of the utensil so that the handle of the utensil is raised above the base, making the utensil easier to grasp. The handle support 50 may have any desired shape, but preferably has a notch 52 or recess defined in its upper surface upon which the stem of the utensil rests, the notch 52 preventing lateral movement of the utensil stem. The vertical utensil holder 10 may also include an arcuate hood 54 extending over the cup portion 28 of the depression 26 for protecting the head of the utensil from dust, spills, etc. Additionally, the surface of the hood 54 provides an area where a decorative design or logo may be printed.

Figure 3:
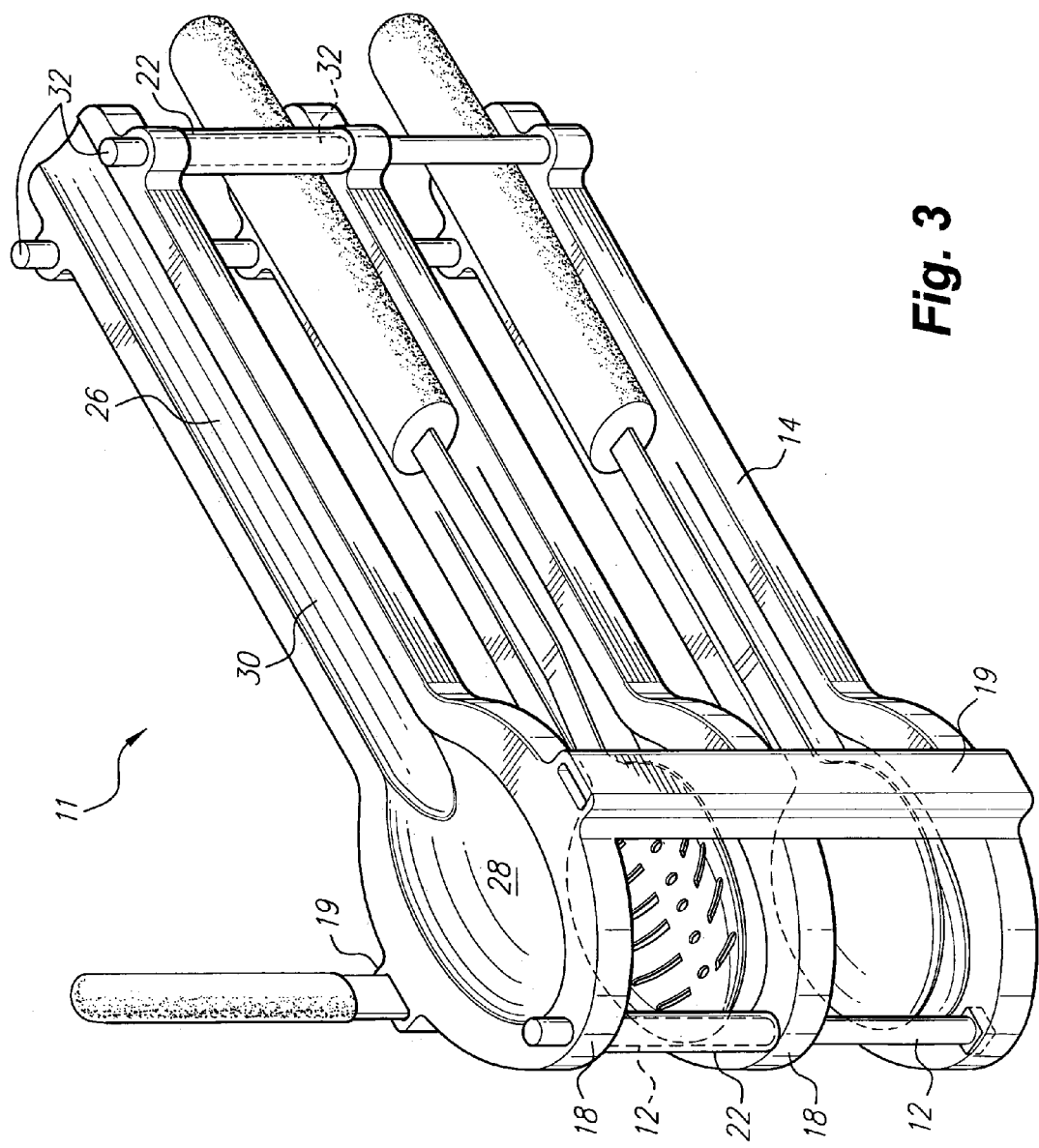
FIG. 3 is a perspective view of a vertical utensil holder according to a second embodiment of the present invention

FIG. 3 depicts an alternative embodiment of the vertical utensil holder, generally designated as 11. The vertical utensil holder 11 is identical to the vertical utensil holder 10 except that at least one rear support rod 32 extends upwardly from a rear end of the base receptacle 14 and attaches to each elevated receptacle 18. Preferably, however, the vertical utensil holder 11 includes two rear support rods 32, as is shown. The vertical utensil holder 11 may also include at least one upright compartment 19 for holding utensils in an upright position. The upright compartment 19 is a cylindrical or slotted compartment attached to the base receptacle 14 at its lower end and to a side edge of each elevated receptacle 18 along its length.

Figure 4:
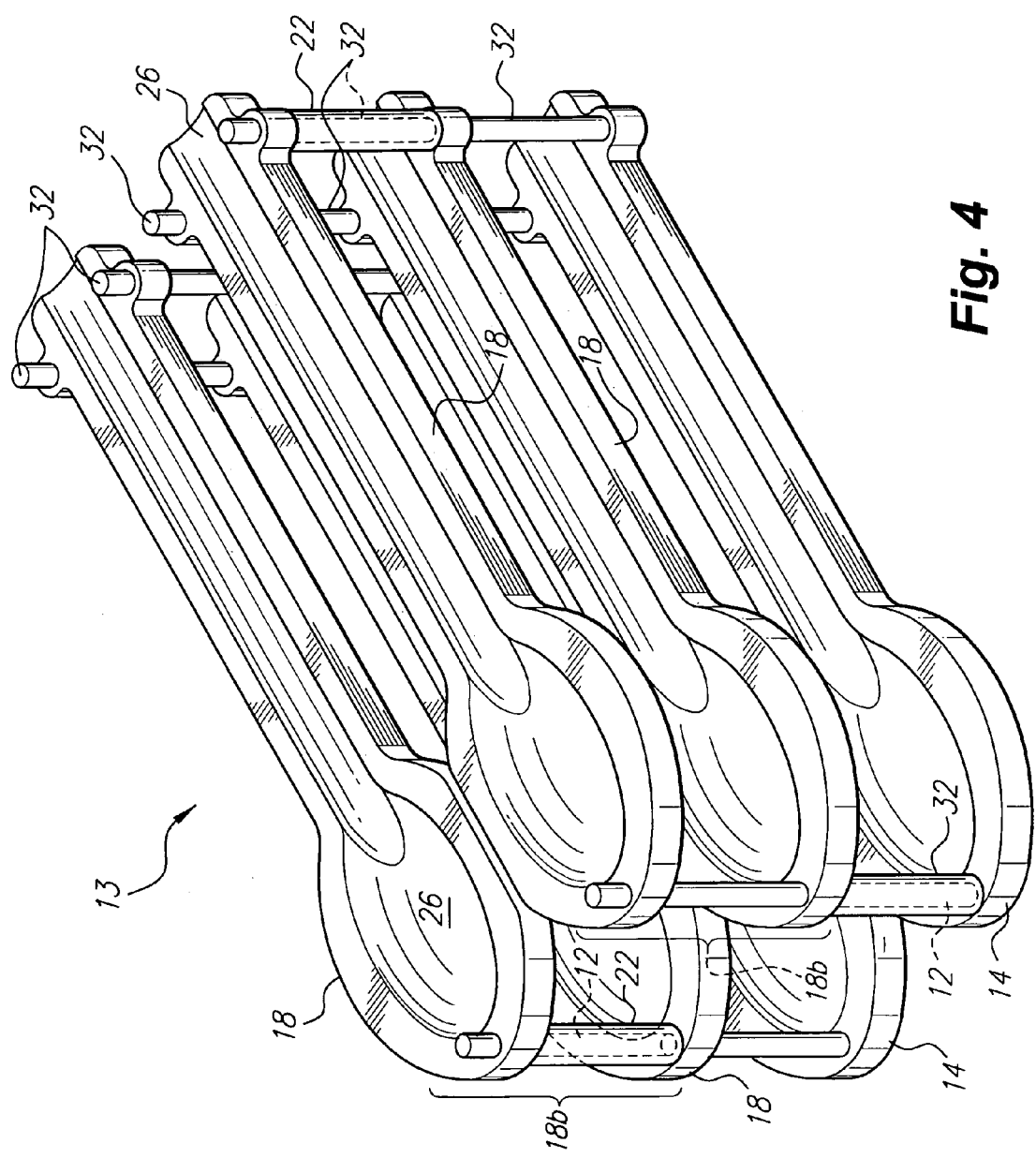
FIG. 4 is a perspective view of a vertical utensil holder according to a third embodiment of the present invention.
Figure 5:
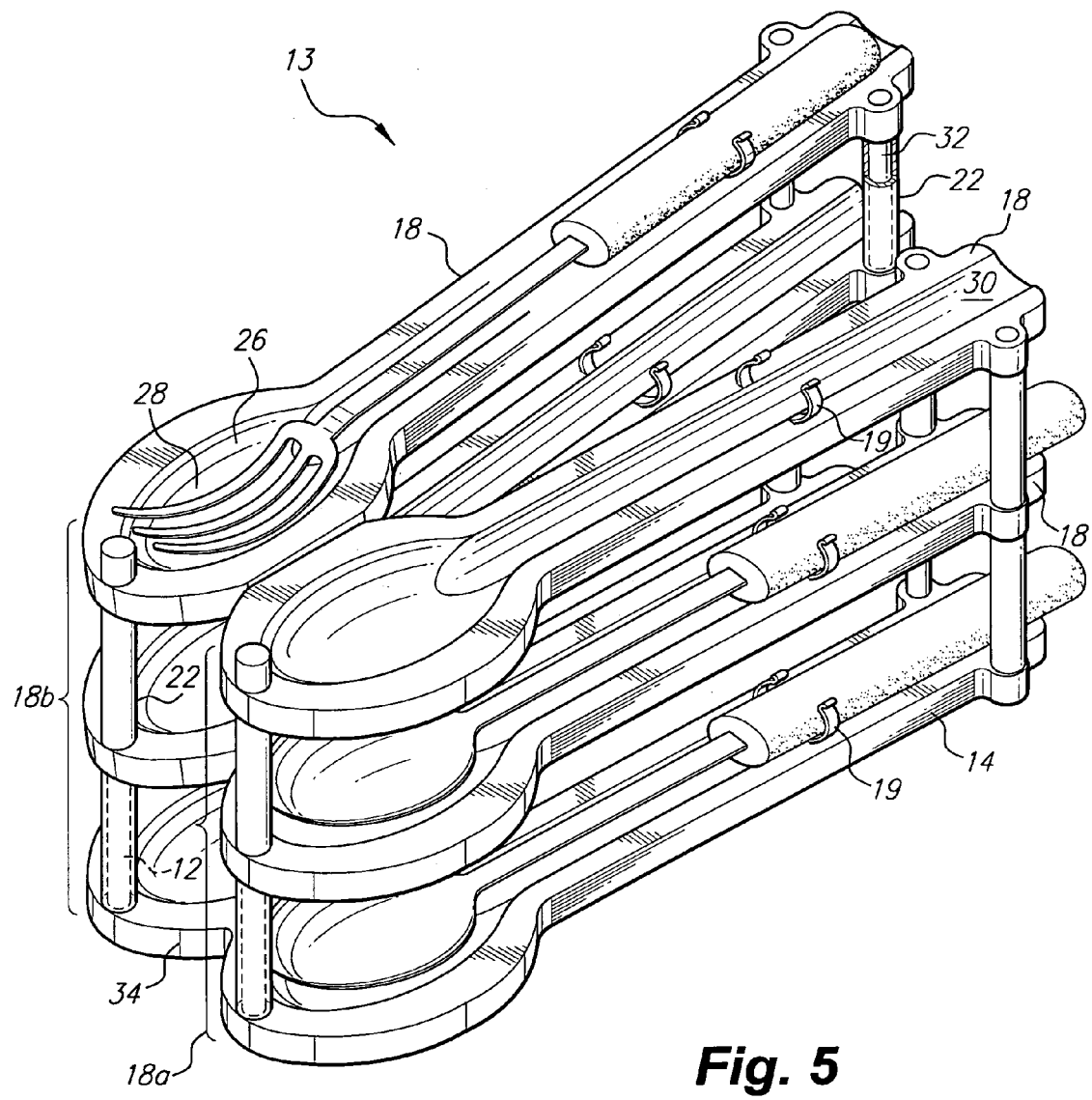
FIG. 5 is a perspective view of a vertical utensil holder according to the third embodiment of the present invention, with elevated receptacles extending diagonally between front and rear support rods.

FIGS. 4 and 5 depict yet another embodiment of the vertical utensil holder, generally designated as 13. The vertical utensil holder 13 and the vertical utensil holder 11 are identical except that the vertical utensil holder 13 includes a second base receptacle 34, a plurality of elevated receptacles 18 disposed in vertical alignment with the second base receptacle 34 to define a second column 18b of elevated receptacles 18, a front support rod extending from a front end of the second base receptacle 34 and attached to the second column 18b of elevated receptacles 18, and a rear support rod extending from a rear end of the second base receptacle 34 and attached to the second column 18b of elevated receptacles. The first and second base receptacles, 14 and 34, are identical. The first and second base receptacles, 14 and 34, are horizontally aligned with one another and joined together at cup portions 28. Identical components will not be further described. Although not shown, the vertical utensil holder 13 may be configured to accommodate more than two columns of elevated receptacles 18.

By varying the length and position of the spacers 22 along the rods 12 and 32, the height and positioning of the elevated receptacles 18 may be varied as desired. FIG. 5 depicts the vertical utensil holder 13, with spacers 22 appropriately positioned such that the second column 18b of elevated receptacles extends diagonally between the front and rear support rods, 12 and 32, while the first column 18a of the elevated receptacles extends horizontally between front and rear support rods, 12 and 32.

Figure 6:
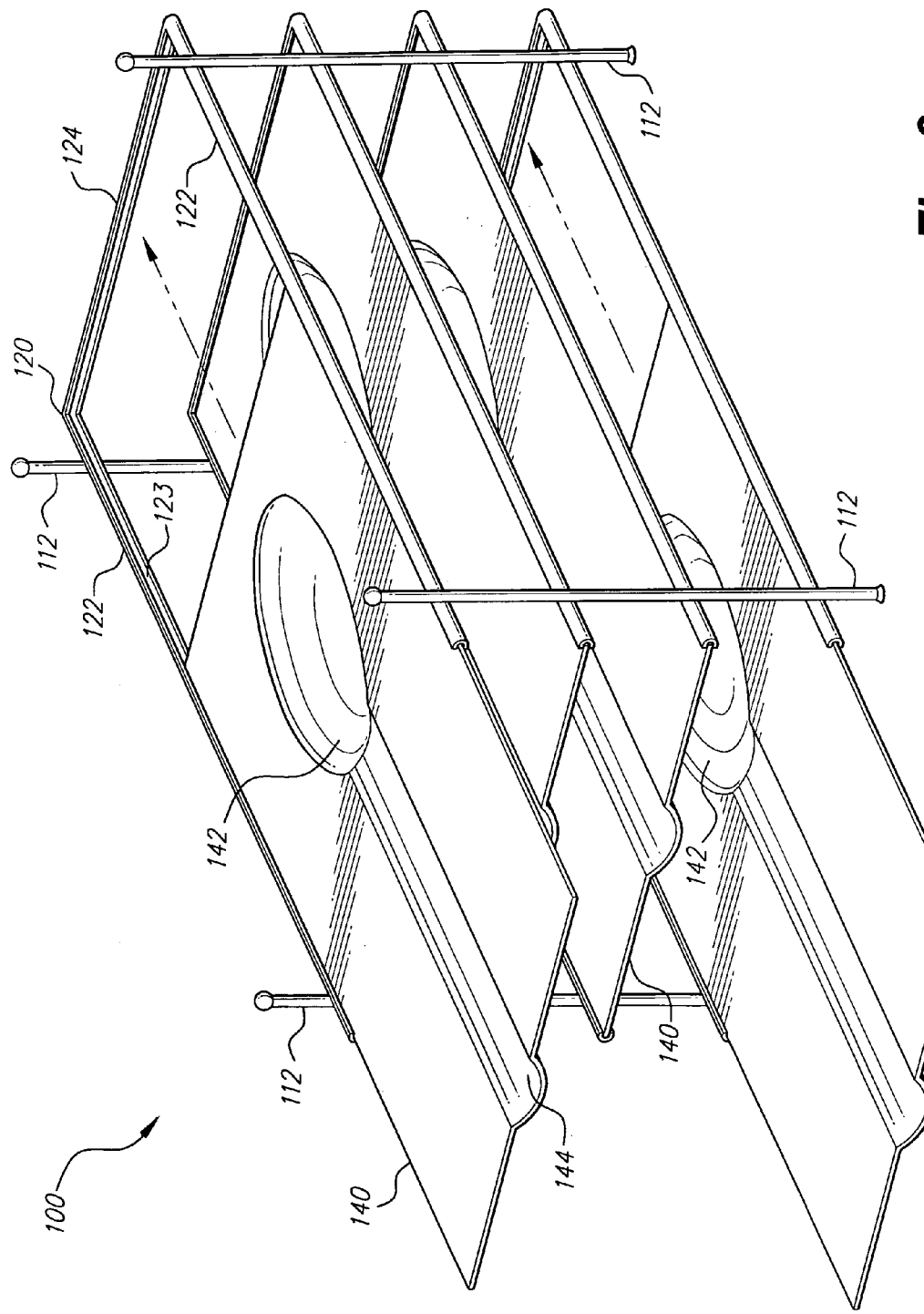
FIG. 6 is a perspective view of a vertical utensil holder according to a fourth embodiment of the present invention, wherein elevated receptacle trays are slidably disposed in tracks supported by vertical rods.

A further embodiment of the vertical utensil holder is illustrated in FIG. 6, generally designated as 100. The vertical utensil holder 100 employs a plurality of receptacle trays 140 that are slidably disposed in a stand, the stand comprising a plurality of vertical support rods 112 that support a plurality of receptacle tracks 120 in a vertically stacked arrangement. Each of the tracks 120 has a pair of side rails 122 and an end rail 124, in a horizontally oriented "U" shaped arrangement. Each of the rails 122, 124, is an elongated member having a "C" cross section defining a channel 123 that runs the length of the rail. A receptacle tray 140 is slidably engaged between the side rails 122 of a track 120 by engaging the edges of the receptacle tray 140 within channels 123 of the side rails 122. At least two support rods 112 are located along each side of the tracks 120.

The receptacle trays 140 are generally flat, planar rectangular members having linear side edges that are slidably received within channels 123 of side rails 122. A first depression 142 is formed in each receptacle tray 140. The first depression 142 preferably corresponds in shape to the contours of a kitchen utensil, or to an end of a kitchen utensil. The first depression 142 may be open, or covered by a hood similar to hood 54, shown in FIG. 8, to protect the utensil and provide a surface for a printed decoration or logo. A second depression 144 may be formed in the receptacle tray 140 to accommodate the stem or handle of a utensil. Alternatively, the second receptacle 144 may be omitted or substituted by a handle support similar to handle support 50, shown in FIG. 8, that supports the handle of a utensil elevated above the surface of the receptacle tray 140.

Figure 7:
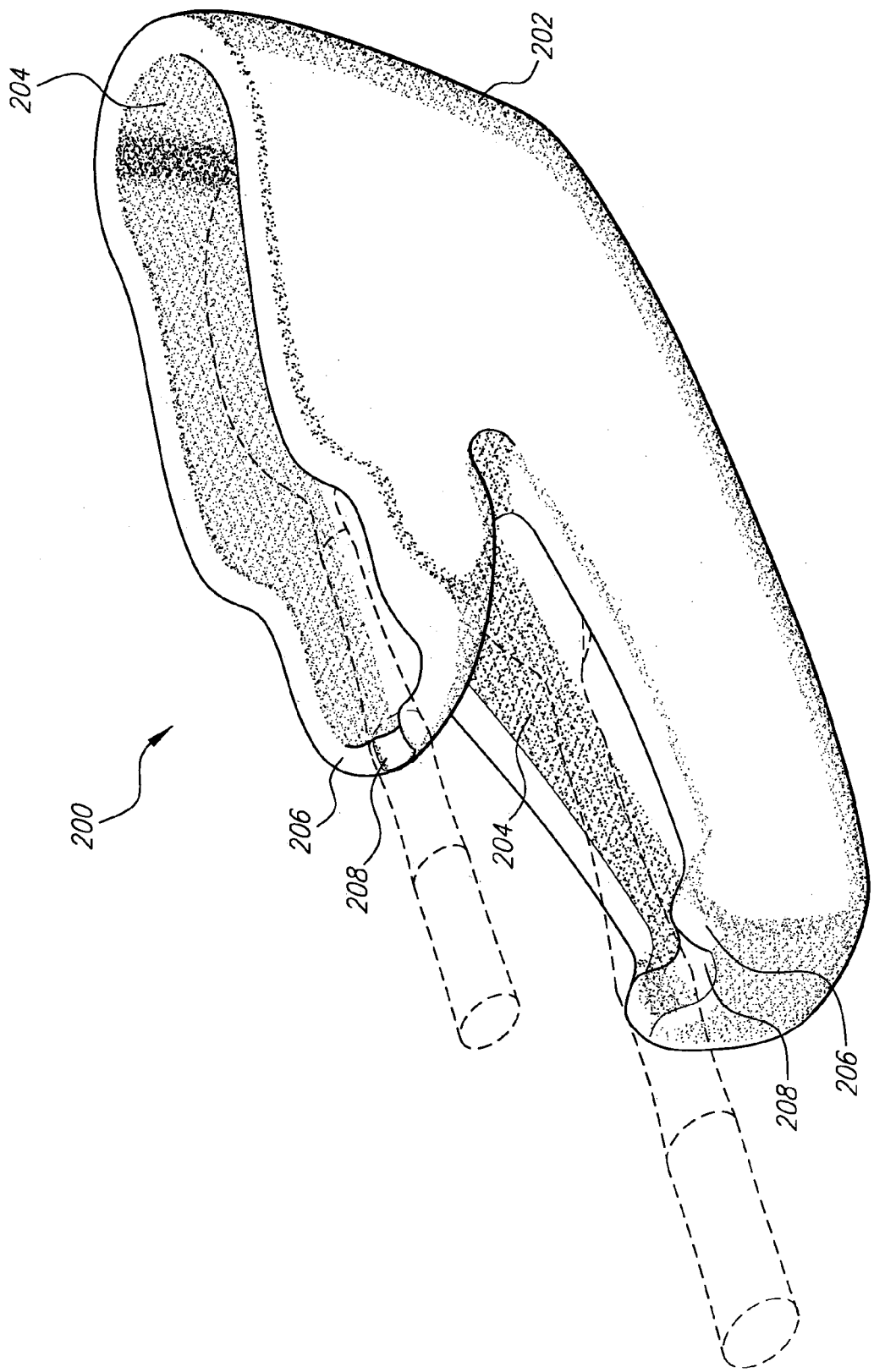
FIG. 7 is a perspective view of a vertical utensil holder according to a fifth embodiment of the present invention, wherein receptacles are defined within the body of a monolithic structure.

A still further embodiment of the vertical utensil holder is illustrated in FIG. 7, generally designated as 200. The vertical utensil holder 200 is a monolithic structure that may be molded or shaped from a variety of materials. The vertical utensil holder 200 comprises a body 202 having a plurality of receptacles 204 defined therein for receiving and supporting a utensil. Each receptacle 204 has a handle supporting end 206 wherein a handle rest 208 is defined. The receptacles 204 are arranged in a vertical or staggered vertical arrangement.

It will be understood that the vertical utensil holders 10, 11, 13, 100, and 200 shown in FIGS. 1–8 are exemplary only, the claimed invention extending to any utensil holder having a plurality of receptacles for kitchen utensils in which the receptacles are stacked vertically.

It is to be understood that the present invention is not limited to the embodiments described above, but encompasses any and all embodiments within the scope of the following claims.

I claim:

1. A vertical utensil holder, comprising:
   at least one upright support rod; and
   a plurality of receptacles adapted for receiving a utensil, the plurality of receptacles being mounted on the at least one support rod and spaced apart one above another and in vertical alignment defining a column of elevated receptacles;
   wherein said at least one upright support rod consists of a single upright support rod having a bottom end, the vertical utensil holder further comprising a horizontally disposed base receptacle adapted for receiving a utensil, the base receptacle being attached to the bottom end of said support rod, said column of elevated receptacles being disposed above the base receptacle in vertical alignment therewith; and
   wherein each said receptacle includes a concave depression defined on an upper surface thereof adapted for corresponding in shape to the contours of kitchen utensils.

2. A vertical utensil holder, comprising:
   at least one upright support rod;
   a plurality of receptacles adapted for receiving a utensil, the plurality of receptacles being mounted on the at least one support rod one above another and in vertical alignment defining a column of elevated receptacles; and
   at least one upright compartment mounted vertically alongside said column of elevated receptacles, the upright compartment having a vertically elongated hollow interior.

3. A vertical utensil holder, comprising:
   at least one upright support rod; and
   a plurality of receptacles adapted for receiving a utensil, the plurality of receptacles being mounted on the at least one support rod one above another and in vertical alignment defining a column of elevated receptacles;
   wherein said at least one upright support rod comprises a plurality of upright support rods, the vertical utensil holder further comprising a plurality of receptacle tracks, each receptacle track having a pair of side rails and an end rail joined together to form a "U" guide, each of the rails having a lengthwise channel formed therein, each of said receptacles being a tray slidably disposed in one of said guides.

4. The vertical utensil holder according to claim 3, wherein each said receptacle tray is a generally flat, planar, rectangular member having linear side edges, each of said receptacle trays being slidably disposed in said guides, the side edges being slidably disposed in the channels defined by the side rails and end rails of said guides.

5. The vertical utensil holder according to claim 3, wherein each said receptacle tray has a depression defined in an upper surface thereof corresponding in shape to contours of a kitchen utensil.

6. A vertical utensil holder, comprising:
   at least one upright support rod; and
   a plurality of receptacles adapted for receiving a utensil, the plurality of receptacles being mounted on the at least one support rod one above another and in vertical alignment defining a column of elevated receptacles;
   wherein each said at least one receptacle tray further comprises a hood covering at least part of each said receptacle.

7. A vertical utensil holder, comprising:
   at least one upright support rod; and
   a plurality of receptacles adapted for receiving a utensil, the plurality of receptacles being mounted on the at least one support rod one above another and in vertical alignment defining a column of elevated receptacles;
   wherein each said receptacle further comprises an elevated handle support defined on an upper surface thereof.

* * * * *